(12) United States Patent
Liu et al.

(10) Patent No.: US 11,417,914 B2
(45) Date of Patent: Aug. 16, 2022

(54) BATTERY, ELECTRONIC DEVICE AND BATTERY PACK

(71) Applicant: NINGDE AMPEREX TECHNOLOGY LIMITED, Ningde (CN)

(72) Inventors: Zuchao Liu, Ningde (CN); Chuantao Song, Ningde (CN); Zhiwen Xiao, Ningde (CN); Haiyang Nan, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 405 days.

(21) Appl. No.: 16/298,151

(22) Filed: Mar. 11, 2019

(65) Prior Publication Data

US 2020/0194842 A1 Jun. 18, 2020

(30) Foreign Application Priority Data

Dec. 14, 2018 (CN) .......................... 201811531435.3

(51) Int. Cl.
*H01M 10/42* (2006.01)
*H02J 7/00* (2006.01)
*H01M 50/531* (2021.01)
*H01M 50/557* (2021.01)
(Continued)

(52) U.S. Cl.
CPC ..... *H01M 10/425* (2013.01); *H01M 10/4207* (2013.01); *H01M 50/531* (2021.01); *H01M 50/557* (2021.01); *H01M 50/581* (2021.01); *H01M 50/583* (2021.01);
(Continued)

(58) Field of Classification Search
CPC .. H01M 50/50–50/598; H01M 10/42–10/4285
See application file for complete search history.

(56) References Cited

U.S. PATENT DOCUMENTS

2018/0287220 A1 10/2018 Woodford et al.
2019/0245193 A1* 8/2019 Kim .................... H01M 50/581

FOREIGN PATENT DOCUMENTS

| CN | 101164216 | * | 4/2008 |
| CN | 101521299 A | | 9/2009 |
| CN | 101931101 A | | 12/2010 |

(Continued)

OTHER PUBLICATIONS

Machine translation of JP 2009-207322, Sep. 2009.*

(Continued)

*Primary Examiner* — Jonathan Crepeau
(74) *Attorney, Agent, or Firm* — WHDA, LLP (57) ABSTRACT

The present application discloses a battery, an electronic device and a battery pack. The battery according to one embodiment comprises a battery cell assembly, the battery cell assembly including a first tab and a protection assembly. The protection assembly is connected to the first tab, and comprises a breaker and a first unidirectional conduction element, the breaker and the first unidirectional conduction element are connected in parallel. The battery, the electronic device and the battery pack provided by the embodiments of the present application may achieve overcharge protection on a soft package battery, and may meet a performance requirement of the soft package battery for discharge at large current.

10 Claims, 7 Drawing Sheets

(51) Int. Cl.
*H01M 50/581* (2021.01)
*H01M 50/583* (2021.01)

(52) U.S. Cl.
CPC ... *H02J 7/0029* (2013.01); *H01M 2010/4271* (2013.01); *H01M 2200/10* (2013.01); *H02J 7/00302* (2020.01)

(56) References Cited

FOREIGN PATENT DOCUMENTS

| CN | 202084609 U | * | 12/2011 |
|---|---|---|---|
| CN | 106207285 A | | 12/2016 |
| CN | 207183396 U | | 4/2018 |
| CN | 208142271 U | * | 11/2018 |
| JP | 2004152580 A | | 5/2004 |
| JP | 2009207322 A | | 9/2009 |

OTHER PUBLICATIONS

Machine translation of CN 207183396U, Apr. 2018.*
Extended European Search Reoort dated May 19, 2020 in counterpart European application 19214858.3, 6 pages.
Chinese First Office Action and Search Reoort dated Mar. 12, 2021 in counterpart Chinese application 201811531435.3, pages in Chinese.
Office Action dated Aug. 30, 2021, issued in counterpart CN Application No. 201811531435.3, with English Translation. (37 pages).

* cited by examiner

BATTERY, ELECTRONIC DEVICE AND BATTERY PACK

CROSS REFERENCE TO RELATED APPLICATIONS

The present application claims the benefit of priority from the China Patent Application No. 201811531435.3, filed on 14 Dec. 2018, the disclosure of which is hereby incorporated by reference in its entirety.

BACKGROUND

1. Technical Field

The present application relates to the field of batteries, and particularly relates to a battery, an electronic device, and a battery pack.

2. Description of the Related Art

Generally, the process of continuing to charge a battery at a high voltage after the battery is charged to a normal full state is called "overcharge" in the industry. The overcharge belongs to one type of electricity abuses, which would result in that lithium ions remaining in a cathode of the battery continue to transfer to an anode of the battery. Since the anode cannot be embedded with more lithium ions after being charged to the normal full state, if the battery is overcharged, the lithium ions will precipitate out on a surface of the anode in a form of metal lithium, and thus an unexpected phenomenon of lithium dendrites is caused. Thus, various danger conditions such as battery separator damage, a battery short circuit, electrolyte leakage and even a fire outbreak of a battery cell are further caused. Therefore, the battery's overcharge resistance has been highly valued by the industry.

For soft package batteries that have been widely used in various electronic products, the following two manners are adopted in the industry to provide overcharge protection. First, a printed circuit board (referred to as "PCB board") is added outside the battery cell. When a charging voltage reaches a limited voltage set by the PCB board, stop charging the battery cell immediately, thereby protecting the battery cell. However, this solution is too costly, and due to a large size of the PCB board, the energy density of the battery cell is significantly reduced. Second, a temperature-sensitive breaker is added outside the battery cell. When the battery cell is overcharged, heat generated by the battery cell is conducted to the inside of the breaker, so that the breaker acts to cut off the circuit, and thus stop charging the battery cell. However, due to the fact that the overcurrent capacity of the breaker is very weak, and the maximum overcurrent capacity is only 20 A, this technical solution cannot meet a requirement of a power type battery for a discharging current up to 80 A or greater. Thus, there is a need in the industry for a solution that is suitable for overcharge protection of the soft pack batteries and that meets the large discharge current requirements of the soft pack batteries.

SUMMARY

Embodiments of the present application aim to provide a battery, an electronic device and a battery pack, which may also meet a discharge performance requirement of a high-power soft package battery for a large current while achieving overcharge protection of the soft package battery.

A battery provided according to one embodiment of the present application includes a battery cell assembly, the battery cell assembly including a first tab; and a protection assembly, the protection assembly being connected to the first tab, the protection assembly including a breaker and a first unidirectional conduction element, and the breaker and the first unidirectional conduction element being connected in parallel.

In some embodiments of the present application, the battery cell assembly further includes a first conductive lead, a first terminal of the breaker and a first terminal of the first unidirectional conduction element are respectively connected to the first tab, and a second terminal of the breaker and a second terminal of the first unidirectional conduction element are respectively connected to the first conductive lead.

In some embodiments of the present application, the breaker is disposed on a surface of the first tab, and insulating glue is disposed between the breaker and the first tab; and the first unidirectional conduction element is disposed on the surface of the first tab, and insulating glue is disposed between the first unidirectional conduction element and the first tab.

In some embodiments of the present application, the battery further includes a second unidirectional conduction element, a first terminal of the second unidirectional conduction element is connected to the first tab, and a second terminal of the second unidirectional conduction element is connected to the first conductive lead.

In some embodiments of the present application, the battery cell assembly further includes: a first conductive lead; and a second conductive lead, electrically connected with the first tab, a first terminal of the breaker and a first terminal of the first unidirectional conduction element being respectively connected to the second conductive lead, and a second terminal of the breaker and a second terminal of the first unidirectional conduction element being respectively connected to the first conductive lead.

In some embodiments of the present application, the battery cell assembly further includes a sealing portion, the first tab penetrates out from the sealing portion, one end of the second conductive lead is connected with the first tab, the other end of the second conductive lead is disposed on a surface of the sealing portion, and the breaker or the first unidirectional conduction element is disposed on the surface of the sealing portion.

In some embodiments of the present application, the first unidirectional conduction element is a diode and the first terminal is a positive terminal, and the first tab is a positive tab.

In some embodiments of the present application, a resistance value of the breaker is from about 0.1 mΩ to about 20 mΩ, and a resistance value of the first unidirectional conduction element is from about 5 mΩ to about 500 mΩ.

An electronic device provided according to another embodiment of the present application includes a battery and a housing, the battery is disposed within the housing, and the electronic device is characterized in that the battery includes a battery cell assembly, the battery cell assembly including a first tab and a second tab; and a protection assembly, the protection assembly being connected to the first tab, the protection assembly including a breaker and a first unidirectional conduction element, and the breaker and the first unidirectional conduction element being connected in parallel.

A battery pack provided according to another embodiment of the present application includes a plurality of batteries, each of the plurality of batteries includes a battery cell assembly, and the battery cell assembly includes a first tab and a second tab; wherein at least one of the plurality of batteries further includes a protection assembly, the protection assembly is connected to the first tab, the protection assembly includes a breaker and a first unidirectional conduction element, and the breaker and the first unidirectional conduction element are connected in parallel.

The battery, the electronic device and the battery pack provided by the embodiments of the present application may achieve overcharge protection on the soft package battery, and may meet a discharge performance requirement of the soft package battery for discharge at large current.

BRIEF DESCRIPTION OF THE DRAWINGS

The accompanying drawings essential for describing the embodiments of the present application or the prior art will be illustrated briefly hereinafter so as to facilitate describing the embodiments of the present application. Obviously, the accompanying drawings described below are only part of the embodiments in the present application. Those skilled in the art still may obtain accompanying drawings of other embodiments according to the structures exemplified in the accompanying drawings on the premise of not needing creative work.

DETAILED DESCRIPTION

Embodiments of this application are described below in detail. Throughout the entire specification of this application, same or similar components or components having same or similar functions are represented by using similar reference numerals. The embodiments related to the accompanying drawings that are described herein are illustrative and schematic, and are used to provide basic understanding for this application. The embodiments of this application should not be construed as limitations to this application.

In this specification, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and derived wordings thereof (such as "horizontally", "downward", and "upward") should be construed as referenced directions described in discussion or shown in the accompanying drawings. These relativistic wordings are merely for ease of description, and require constructing or operating this application in a particular direction.

As used in this application, terms "about", "roughly", "substantially", "essentially", and "approximately" are used for describing and explaining a small variation. When being used in combination with an event or a case, the terms may refer to an example in which the event or case exactly occurs, or an example in which the event or case similarly occurs. For example, when being used in combination with a value, the terms may refer to a variation range being less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are "substantially" the same or "approximate".

Furthermore, in order to facilitate description, "first", "second", "third" and the like may be used herein for distinguishing different components of one figure or a series of figures. "First", "second", "third" and the like are not intended to describe corresponding components.

In the present application, otherwise specifically assigned or limited, "dispose", "connect", "couple", "fix" and words similar to them are wide in use, and those skilled in the art may understand the above words according to specific conditions, such as, fixed connection, detachable connection or integrated connection; it may also be mechanical connection or electrical connection; it may also be direct connection or indirect connection through an intermediary structure; and it may also be inner communication of two components.

Overcharge protection of a cylindrical battery cell is achieved mainly by depending on a current interrupt device (CID). However, it is not suitable for installing the CID for a soft package battery, and overcharge protection is achieved only in other manners. The soft package battery currently adopts the manner that a temperature-sensitive breaker is connected to a positive tab of a battery cell in series. When the battery is overcharged, consequently temperature is too high, heat of the battery cell is conducted into the breaker through the positive tab and a top sealed edge of a battery cell, and the heat in the breaker is conducted to a metal spring piece inside the breaker. The heat of the metal spring piece may be gradually accumulated. When the metal spring piece reaches a designed operating temperature, the breaker cuts off a charging current, thereby effectively protecting the battery cell. However, due to the fact the overcurrent capacity of the circuit breaker is weak, to a maximum extent, only a current of 20 A may pass. When the current flowing through the breaker exceeds 20 A, the metal spring piece inside the breaker generates heat so as to interrupt the current. However, in a power type electronic product, a discharging current reaches up to 100 A during discharge of the battery cell, and far exceeds the maximum passing current 20 A of the breaker. Thus, during discharge of the battery cell, since the discharging current is very large, heat generated by the metal spring piece inside the breaker may fast cut off the current, and consequently the battery cell may not continue to discharge.

In view of the above situation, an embodiment of the present Application provides a battery, in which a breaker is connected in parallel with a unidirectional conduction element, and then the parallel circuit is integrally connected in series to a first tab (such as a positive tab) of the battery cell. When the battery cell is charged, the current only passes the loop of the breaker. Since the charging current is very small, the breaker may guarantee that normal charge is performed on the battery cell. After overcharge heat generating happens to the battery cell, the metal spring piece inside the breaker may act to make the breaker in a disconnected state, and therefore the charging current is interrupted, and overcharge protection is formed for the battery cell. During discharge of the battery cell, as a discharging current is very large, the breaker generates heat so that the circuit is disconnected very fast. However, the current may pass through the loop of the unidirectional conduction element, so that the battery cell may continue to discharge, and normal work of the battery cell may not be affected. In addition to the effective protection when the battery is overcharged, the present application may also meet the discharge performance requirements of high power soft pack battery discharging at high current.

Figure 1:
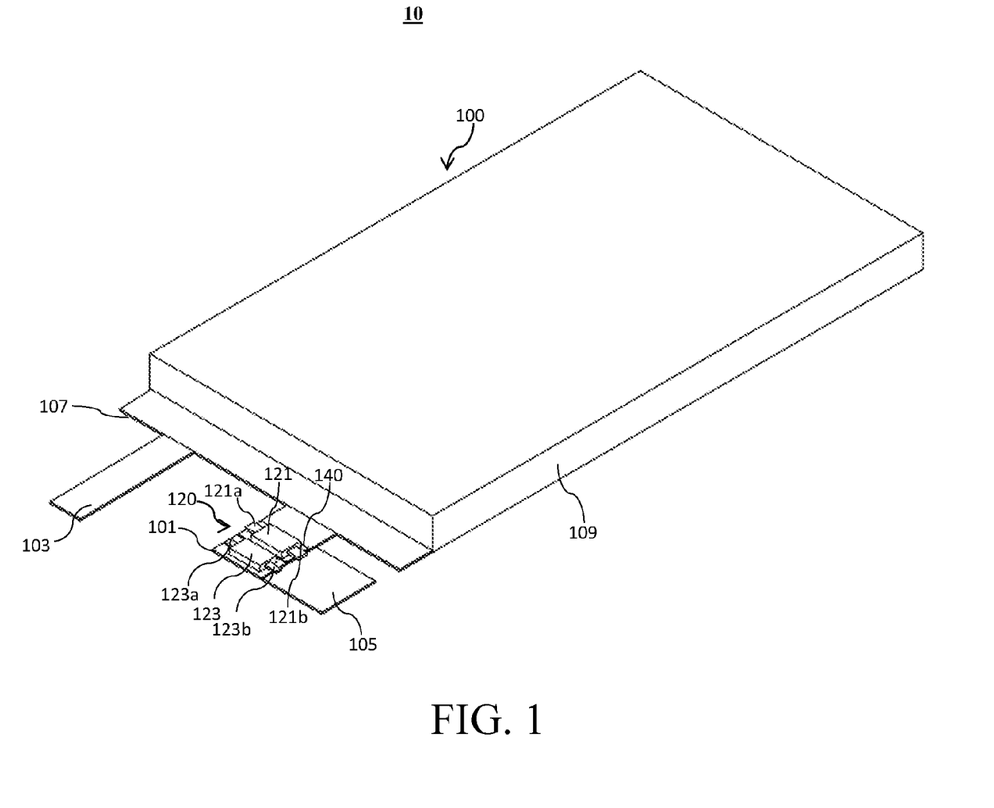
FIG. 1 shows a structural schematic view of a battery according to one embodiment of the present application.

FIG. 1 shows a schematic view of a battery 10 according to one embodiment of the present application. As shown in FIG. 1, the battery 10 according to one embodiment of the present application includes: a battery cell assembly 100 and a protection assembly 120.

The battery cell assembly 100 includes a first tab 101, a second tab 103, a first conductive lead 105, a sealing portion 107, and a battery cell body 109. The first tab 101 and the second tab 103 respectively penetrate out from the sealing portion 107.

According to some embodiments of the present application, the first tab 101 may be a positive tab, and the material of the positive tab includes, but not limited to, aluminum. The second tab 103 may be an negative tab, and the material of the negative tab includes, but not limited to, nickel, copper plated nickel, copper or titanium.

The first conductive lead 105 is connected to the first tab 101. A length direction of the first conductive lead 105 is parallel to the first tab 101. In other embodiments of the present application, the length direction of the first conductive lead 105 may be perpendicular to the first tab 101.

The protection assembly 120 includes a breaker 121 and a first unidirectional conduction element 123. As shown in FIG. 1, the protection assembly 120 is connected to the first tab 101 via insulating glue 140.

A first terminal 121a of the breaker 121 is connected to the first tab 101, and a second terminal 121b of the breaker 121 is connected to the first conductive lead 105. The breaker 121 is disposed on a surface of the first tab 101. The insulating glue 140 is disposed between the breaker 121 and the first tab 101. The resistance value of the breaker 121 is from about 0.1 mΩ to about 20 mΩ. In some embodiments of the present application, the resistance value of the breaker 121 is from about 0.5 mΩ to about 10 mΩ.

A first terminal 123a of the first unidirectional conduction element 123 is connected to the first tab 101, and a second terminal 123b of the first unidirectional conduction element 123 is connected to the first conductive lead 105. The first unidirectional conduction element 123 is disposed on the surface of the first tab 101. The insulating glue 140 is disposed between the first unidirectional conduction element 123 and the first tab 101.

According to some embodiments of the present application, the breaker 121 and the first unidirectional conduction element 123 may be connected to the first tab 101 in other manners, such as, but not limited to, welding or attaching and fixing by using an adhering agent or a double-sided adhesive tape.

According to some embodiments of the present application, the first unidirectional conduction element 123 is a diode. The first terminal 123a of the first unidirectional conduction element 123 is a positive terminal of the diode. A resistance value of the first unidirectional conduction element 123 is from about 5 mΩ to about 500 mΩ. In some embodiments of the present application, the resistance value of the first unidirectional conduction element 123 is from about 5 mΩ to about 300 mΩ. In some embodiments of the present application, the resistance value of the first unidirectional conduction element 123 is from about 10 mΩ to about 100 mΩ. In other embodiments of the present application, the first unidirectional conduction element 123 may also be any electronic assembly with the unidirectional conduction function, such as, but not limited to, a thyristor or a field-effect transistor.

Figure 2:
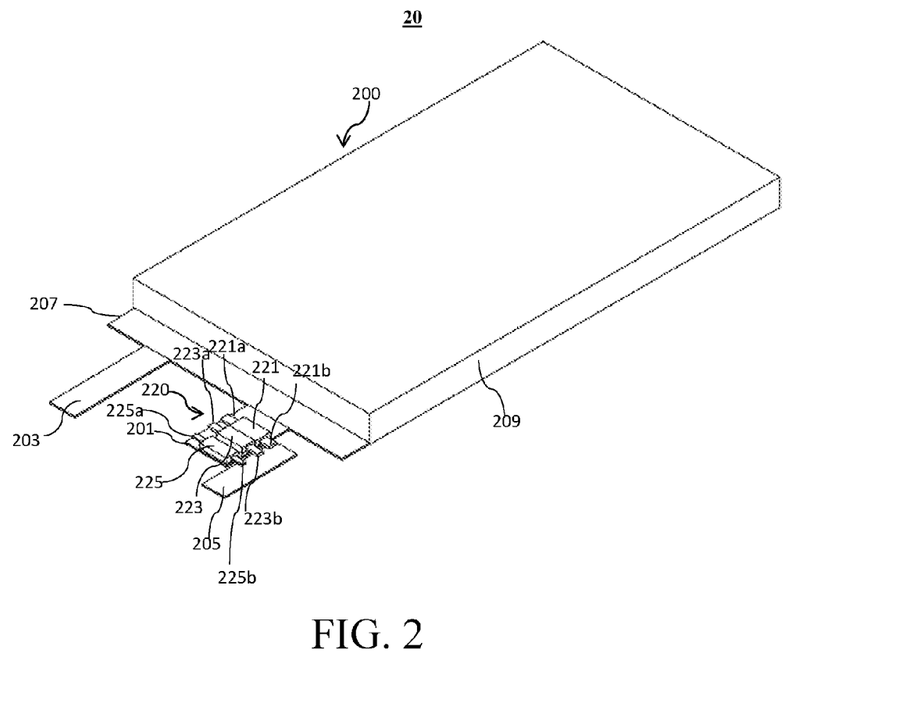
FIG. 2 shows a structural schematic view of a battery according to another embodiment of the present application.

FIG. 2 shows a schematic view of a battery 20 according to another embodiment of the present application. As shown in FIG. 2, the battery 20 according to another embodiment of the present application includes: a battery cell assembly 200 and a protection assembly 220.

The battery cell assembly 200 includes a first tab 201, a second tab 203, a first conductive lead 205, a sealing portion 207, and a battery cell body 209. The first tab 201 and the second tab 203 respectively penetrate out from the sealing portion 207.

According to some embodiments of the present application, the first tab 201 may be a positive tab, and the material of the positive tab includes, but not limited to, aluminum. The second tab 203 may be an negative tab, and the material of the negative tab includes, but not limited to, nickel, copper plated nickel, copper or titanium.

The first conductive lead 205 is connected to the first tab 201. A length direction of the first conductive lead 205 is perpendicular to the first tab 201. In other embodiments of the present application, the length direction of the first conductive lead 205 may be parallel to the first tab 201.

The protection assembly 220 includes a breaker 221, a first unidirectional conduction element 223, and a second unidirectional conduction element 225. The protection assembly 220 is connected to the first tab 201 through insulating glue (not shown in the figures).

A first terminal 221a of the breaker 221 is connected to the first tab 201, and a second terminal 221b of the breaker 221 is connected to the first conductive lead 205. The breaker 221 is disposed on a surface of the first tab 201. The insulating glue (not shown in the figures) is disposed between the breaker 221 and the first tab 201. A resistance value of the breaker 221 is from about 0.1 mΩ to about 20 mΩ. In some embodiments of the present application, the resistance value of the breaker 221 is from about 0.5 mΩ to about 10 mΩ.

A first terminal 223a of the first unidirectional conduction element 223 is connected to the first tab 201, and a second terminal 223b of the first unidirectional conduction element 223 is connected to the first conductive lead 205. The first unidirectional conduction element 223 is disposed on the surface of the first tab 201. The insulating glue (not shown in the figures) is disposed between the first unidirectional conduction element 223 and the first tab 201.

A first terminal 225a of the second unidirectional conduction element 225 is connected to the first tab 201, and a second terminal 225b of the second unidirectional conduction element 225 is connected to the first conductive lead 205. The second unidirectional conduction element 225 is disposed on the surface of the first tab 201. Similar to the first unidirectional conduction element 223, the insulating glue (not shown in the figures) is disposed between the second unidirectional conduction element 225 and the first tab 201.

According to some embodiments of the present application, the breaker 221, the first unidirectional conduction element 223, and the second unidirectional conduction element 225 may be connected to the first tab 201 in other manners, such as, but not limited to, welding or attaching and fixing by using an adhering agent or a doubled-sided adhesive tape.

According to some embodiments of the present application, the first unidirectional conduction element 223 is a diode. The first terminal 223a of the first unidirectional conduction element 223 is a positive terminal of the diode. The resistance value of the first unidirectional conduction element 223 is from about 5 mΩ to about 500 mΩ. In some embodiments of the present application, the resistance value of the first unidirectional conduction element 223 is from about 5 mΩ to about 300 mΩ. In some embodiments of the present application, the resistance value of the first unidirectional conduction element 223 is from about 10 mΩ to about 100 mΩ. In other embodiments of the present application, the first unidirectional conduction element 223 may also be any electronic assembly with a unidirectional conduction function, such as, but not limited to, a thyristor or a field-effect transistor.

According to some embodiments of the present application, the second unidirectional conduction element 225 is a diode. The first terminal 225a of the second unidirectional conduction element 225 is a positive terminal of the diode. The resistance value of the second unidirectional conduction element 225 is from about 5 mΩ to about 500 mΩ. In some embodiments of the present application, the resistance value of the second unidirectional conduction element 225 is from about 1 mΩ to about 300 mΩ. In some embodiments of the present application, the resistance value of the second unidirectional conduction element 225 is from about 10 mΩ to about 100 mΩ. In other embodiments of the present application, the second unidirectional conduction element 225 may also be any electronic assembly with a unidirectional conduction function, such as, but not limited to, a thyristor or a field-effect transistor.

Figure 3:
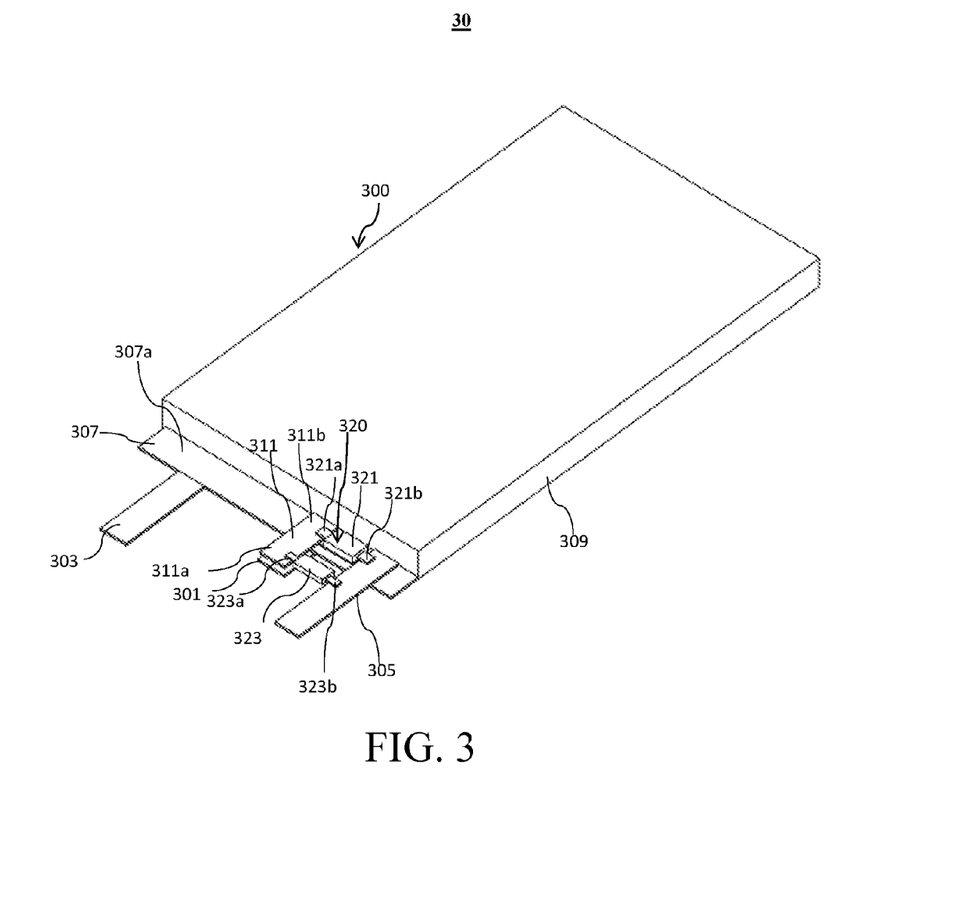
FIG. 3 shows a structural schematic view of a battery according to another embodiment of the present application.

FIG. 3 shows a schematic view of a battery 300 according to another embodiment of the present application. As shown in FIG. 3, the battery 30 according to another embodiment of the present application includes: a battery cell assembly 300 and a protection assembly 320.

The battery cell assembly 300 includes a first tab 301, a second tab 303, a first conductive lead 305, a sealing portion 307, a battery cell body 309 and a second conductive lead 311. The first tab 301 and the second tab 303 respectively penetrate out from the sealing portion 307.

According to some embodiments of the present application, the first tab 301 may be a positive tab, and the material of the positive tab includes, but not limited to, aluminum. The second tab 303 may be a negative tab, and the material of the negative tab includes, but not limited to, nickel, copper plated nickel, copper or titanium.

The first conductive lead 305 is disposed on a surface 307a of the sealing portion 307. A length direction of the first conductive lead 305 is perpendicular to the first tab 301. In other embodiments of the present application, the length direction of the first conductive lead 305 may be parallel to the first tab 301.

One end 311a of the second conductive lead 311 is connected with the first tab 301, and another end 311b of the second conductive lead 311 is disposed on the surface 307a of the sealing portion 307.

The protection assembly 320 includes a breaker 321 and a first unidirectional conduction element 323.

A first terminal 321a of the breaker 321 is connected to the second conductive lead 311. A second terminal 321b of the breaker 321 is connected to the first conductive lead 305. The breaker 321 is disposed on the surface 307a of the sealing portion 307 via. insulating glue (not shown in the figures). The resistance value of the breaker 321 is from about 0.1 mΩ to about 20 mΩ. In some embodiments of the present application, the resistance value of the breaker 321 is from about 1 mΩ to about 10 mΩ. A first terminal 323a of the first unidirectional conduction element 323 is connected to the second conductive lead 311 in, but not limited to, a welding manner or an adhering manner. A second terminal 323b of the first unidirectional conduction element 323 is connected to the first conductive lead 305 in, but not limited to, a welding manner or an adhering manner.

According to some embodiments of the present application, the breaker 321 may be disposed on the surface 307a of the sealing portion 307 in other manners, such as, but not limited to, welding or attaching and fixing by using an adhering agent or a doubled-sided adhesive tape.

In other embodiments of the present application, the position of the breaker 321 and the position of the first unidirectional conduction element 323 may be opposite to positions shown in FIG. 3. That is, the first unidirectional conduction element 323 is disposed on the surface 307a of the sealing portion 307 through insulating glue or in other proper manners, and the first terminal 321a of the breaker 321 is connected to the second conductive lead 311 in manners of welding and adhering or in other proper manners. The second terminal 321b of the breaker 321 is connected to the first conductive lead 305 in manners of welding and adhering or in other proper manners.

According to some embodiments of the present application, the first unidirectional conduction element 323 is a diode. The first terminal 323a of the first unidirectional conduction element 323 is a positive terminal of the diode. The resistance value of the first unidirectional conduction element 323 is from about 5 mΩ to 500 mΩ. In some embodiments of the present application, the resistance value of the first unidirectional conduction element 323 is from about 5 mΩ to about 300 mΩ. In some embodiments of the present application, the resistance value of the first unidirectional conduction element 323 is from about 10 mΩ to about 100 mΩ. In other embodiments of the present application, the first unidirectional conduction element 323 may also be any electronic assembly with a unidirectional conduction function, such as, but not limited to, a thyristor or a field-effect transistor.

In other embodiments of the present application, the protection assembly 320 may also include extra one or more unidirectional conduction elements, the extra one or more unidirectional conduction elements may be disposed between the second conductive lead 311 and the first conductive lead 305, or disposed on the surface 307a of the sealing portion 307, so that the plurality of unidirectional conduction elements are connected in parallel. The plurality of unidirectional conduction elements connected in parallel may lower the current passing each unidirectional conduction element during discharge, and therefore the surface temperature of each unidirectional conduction element and heat generated thereof may be significantly lowered.

Figure 4:
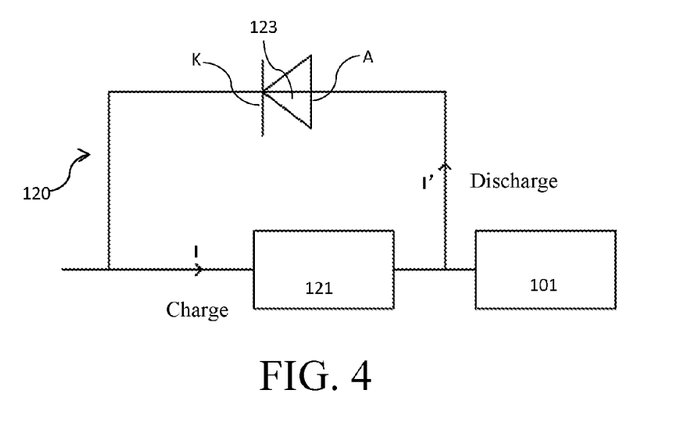
FIG. 4 shows a circuit schematic view of electric connection between a first tab of a battery cell assembly and a protection assembly in the embodiment shown according to FIG. 1.

FIG. 4 shows a circuit schematic view of electric connection between the first tab 101 of the battery cell assembly 100 and the protection assembly 120 in the embodiment shown according to FIG. 1. As shown in FIG. 4, the breaker 121 and the first unidirectional conduction element 123 of the protection assembly 120 are connected in parallel, and a positive terminal A, namely the first terminal 123a, of the first unidirectional conduction element 123 is connected with the first tab 101 of the battery cell assembly 100. A negative terminal K, namely the second terminal 123b, of the first unidirectional conduction element 123 is connected to the first conducive lead 105 of the battery 10. The first unidirectional conduction element 123 has a unidirectional conduction function, that is, on the premise that an electric potential difference exists, the current may only flow to the negative terminal K of the first unidirectional conduction element 123 from the positive terminal A of the first unidirectional conduction element 123. Specifically, when the battery cell assembly 100 is charged, a current I may only pass from the loop of the breaker 121, rather than the loop of the first unidirectional conduction element 123. After overcharge heat generation happens to the battery cell assembly 100, the metal spring piece inside the temperature sensitive breaker 121 acts. Consequently, the breaker 121 is in a disconnected state so as to cut off the charging current I, and therefore overcharge protection is formed for the battery cell assembly 100. During discharge of the battery cell assembly 100, since a discharging current I' is very large, the breaker 121 generates heat very fast and thus being disconnected, then the current I' may only flow to the negative terminal K of the first unidirectional conduction element 123 from the positive terminal A of the first unidirectional conduction element 123, so that the battery cell assembly 100 may continue to discharge. Moreover, the first unidirectional conduction element 123 may allow a large current (such as 20 A, 50 A, 80 A or 100 A or greater) to pass, and normal discharge work of the battery cell assembly 100 may not be affected.

Thus, the breaker and the first unidirectional conduction element are used in parallel in the present application. When the battery cell assembly is charged, since the charging current is small (generally less than 20 A), the action may not happen to the breaker for disconnection during normal charge, thus, normal charge may be performed on the battery cell. When the overcharge happens to the battery cell, since the heat is generated in the battery cell after the overcharge of the battery cell, the heat is conducted into the breaker, the metal spring piece inside the breaker is triggered to act so as to disconnect the breaker, and therefore the charging current is cut off to form effective overcharge protection on the battery cell. During discharge of the battery cell, since the discharging current is very large, the breaker is heated very fast, so that the inner metal spring piece acts to disconnect the breaker, however, the discharging current may continue to discharge via the first unidirectional conduction element, normal discharge of the battery cell may not be affected, and therefore the performance requirement for the battery cell to perform large current discharge is met.

The present application is not limited to a circuit connection manner shown in FIG. 4, and other circuit connection manners may also be allowed, such as circuit connection manners shown in FIG. 2 and FIG. 3 (that is, one or more unidirectional conduction elements are connected with the breaker in parallel), which may all achieve the objectives of the present application.

Application of the battery of the present application is not specifically limited, and the battery is suitable for electronic devices in various fields. In one embodiment, the battery of the present application may be used for, but not limited to, a notebook computer, a pen inputting type computer, a mobile computer, an E-book player, a portable phone, a portable fax machine, a portable duplicator, a portable printer, head-mounted stereo headphones, a video cassette recorder, a liquid crystal display television, a portable cleaner, a portable CD player, a mini disc, a transceiver, an electronic notebook, a calculator, a memory card, a portable recorder, a radio, a standby power source, an electric machine, an automobile, a motorcycle, a motor bicycle, a bicycle, a lighting appliance, a toy, a game console, a clock, an electric tool, a flash lamp, a camera, a domestic use large storage battery, a lithium ion capacitor and the like.

According to some embodiments of the present application, an electronic device is further provided. The electronic device includes a battery and a housing, and the battery is disposed within the housing. The battery includes a battery cell assembly and a protection assembly, and the battery cell assembly includes a first tab and a second tab. The protection assembly is connected to the first tab. The protection assembly includes a breaker and a first unidirectional conduction element, and the breaker and the first unidirectional conduction element are connected in parallel.

According to some embodiments of the present application, the first tab may be a positive tab, and the material of the positive tab includes, but not limited to, aluminum. The second tab may be an negative tab, and the negative tab includes, but not limited to, nickel, copper plated nickel, copper or titanium.

In some embodiments of the present application, the electronic device may include the battery as shown in FIG. 1 to FIG. 3. The embodiments of the present application are not limited to the above embodiments. The electronic device may include any battery connecting one or more unidirectional conduction elements and a breaker in parallel, and then connecting a positive terminal of the one or more unidirectional conduction elements to the positive tab of the battery cell assembly or to the conductive lead connected with the positive tab, and the battery may be used with one or more other batteries in parallel or series.

Figure 5:
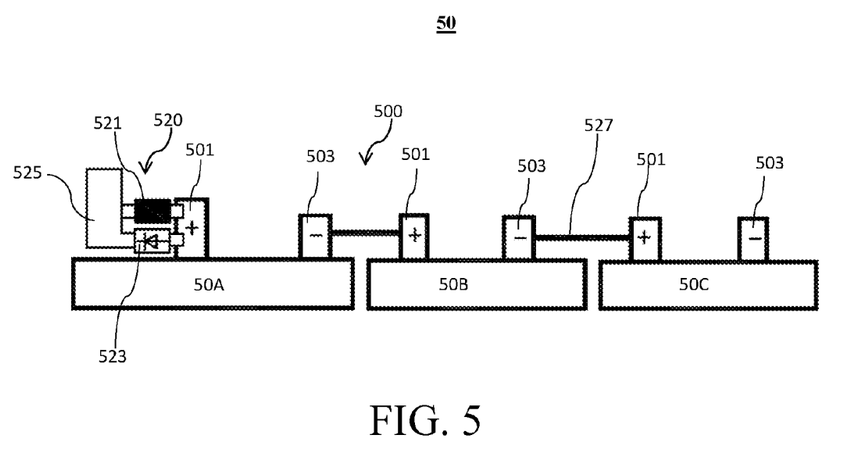
FIG. 5 shows a schematic view of a battery pack according to one embodiment of the present application.

FIG. 5 shows a schematic view of a battery pack 50 according to one embodiment of the present application. As shown in FIG. 5, the battery pack 50 includes batteries 50A, 50B and 50C connected in series. In other embodiments of the present application, the battery pack 50 includes one or more batteries, in any number, connected in series.

Each of the batteries 50A, 50B and 50C as shown in FIG. 5 includes a battery cell assembly 500. Each battery cell assembly 500 is a battery cell assembly the same as the battery cell assembly 100 as shown in FIG. 1. Each battery cell assembly 500 includes a first tab 501 and a second tab 503. The battery cell assembly 500 may be a battery cell assembly according to any embodiment of the present application.

As shown in FIG. 5, the battery 50A includes a protection assembly 520. In other embodiments of the present application, one or more batteries in the battery pack 50 may include the protection assembly 520.

The protection assembly 520 is connected to the first tab 501 of the battery 50A. The protection assembly 520 includes a breaker 521 and a first unidirectional conduction element 523. The breaker 521 and the first unidirectional conduction element 523 are connected in parallel. The breaker 521 and one end of the first unidirectional conduction element 523 are connected to the first tab 501 of the battery 50A, and the breaker 521 and the other end of the first unidirectional conduction element 523 are connected to a conductive lead 525 of the battery 50A. The protection assembly 520 may be a protection assembly according to any embodiment of the present application.

As shown in FIG. 5, the second tab 503 of the battery 50A and the first tab 501 of the battery 50B are connected through a nickel strip 527, and the second tab 503 of the battery 50B and the first tab 501 of the battery 50C are connected through the nickel strip 527. In other embodiments of the present application, the batteries may be connected through any proper metal strip.

Figure 6:
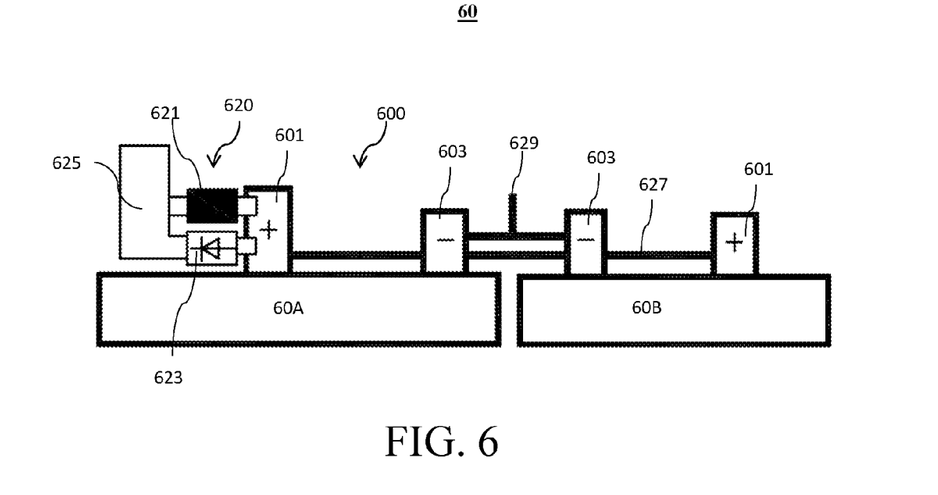
FIG. 6 shows a schematic view of a battery pack according to another embodiment of the present application.

FIG. 6 shows a schematic view of a battery pack 60 according to another embodiment of the present application. As shown in FIG. 6, the battery pack 60 includes batteries 60A and 60B in parallel. In other embodiments of the present application, the battery pack 60 includes one or more batteries, in any number, in parallel.

Each of the batteries 60A and 60B as shown in FIG. 6 includes a battery cell assembly 600. Each battery cell assembly 600 is a battery cell assembly the same as the battery cell assembly 100 as shown in FIG. 1. Each battery cell assembly 600 includes a first tab 601 and a second tab 603. The battery cell assembly 600 may be a battery cell assembly according to any embodiment of the present application.

As shown in FIG. 6, the battery 60A includes a protection assembly 620. In other embodiments of the present application, one or more batteries in the battery pack 60 may include the protection assembly 620.

The protection assembly 620 is connected to the first tab 601 of the battery 60A. The protection assembly 620 includes a breaker 621 and a first unidirectional conduction element 623. The breaker 621 and the first unidirectional conduction element 623 are connected in parallel. The breaker 621 and one end of the first unidirectional conduction element 623 are connected to the first tab 601 of the battery 60A, and the breaker 621 and the other end of the first unidirectional conduction element 623 are connected to a conductive lead 625 of the battery 60A. The protection assembly 620 may be a protection assembly according to any embodiment of the present application.

As shown in FIG. 6, the first tab 601 of the battery 60A and the first tab 601 of the battery 60B are connected through a nickel strip 626, and the second tab 603 of the battery 60A and the second tab 603 of the battery 60B are connected through a nickel strip 629. In other embodiments of the present application, the batteries may be connected through any proper metal strip.

Figure 7:
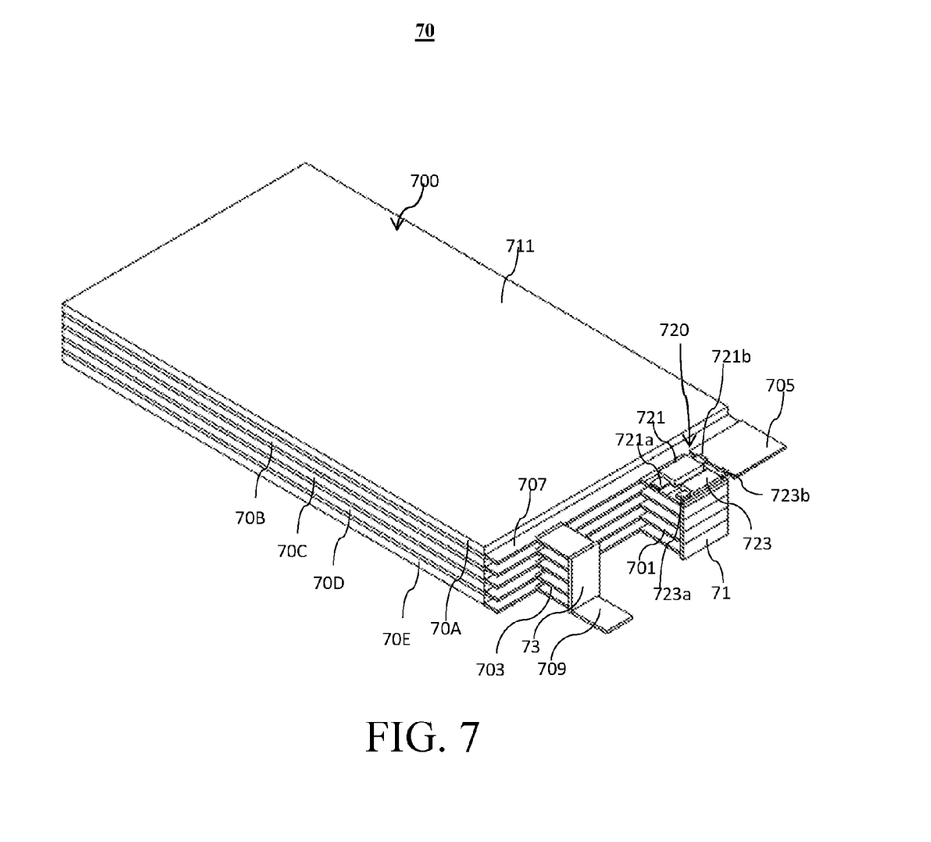
FIG. 7 is a structural schematic view of a battery pack formed by a plurality of batteries in parallel according to one embodiment of the present application.

FIG. 7 is a structural schematic view of a battery pack 70 formed by a plurality of batteries in parallel according to one embodiment of the present application. The battery pack 70 shown in FIG. 7 is formed by stacking a plurality of batteries 70A, 70B, 70C, 70D and 70E in parallel. Each of the batteries 70A, 70B, 70C, 70D and 70E may include a battery cell assembly 700. The battery pack 70 may further include a protection assembly 720, a first adapter plate 71, a second adapter plate 73, a first conductive lead 705 and a second conductive lead 709.

The battery cell assembly 700 includes: a first tab 701, a second tab 703, a sealing portion 707 and a battery cell body 711. The first tab 701 and the second tab 703 respectively penetrate out from the sealing portion 707.

According to some embodiments of the present application, the first tab 701 may be a positive tab, and the material of the positive tab includes, but not limited to, aluminum. The second tab 703 may be an negative tab, and the material of the negative tab includes, but not limited to, nickel, copper plated nickel, copper or titanium.

The first conductive lead 705 is connected to the first tab 701 of the battery 70A. The length direction of the first conductive lead 705 is parallel to the first tab 701 of the battery 70A. In other embodiments of the present application, the length direction of the first conductive lead 705 may be perpendicular to the first tab 701 of the battery 70A.

The protection assembly 720 includes a breaker 721 and a first unidirectional conduction element 723. The protection assembly 720 may be connected to the first tab 701 of the battery 70A through insulating glue (not shown in the figures).

A first terminal 721*a* of the breaker 721 is connected to the first tab 701 of the battery 70A, and a second terminal 721*b* of the breaker 721 is connected to the first conductive lead 705. The breaker 721 is disposed on a surface of the first tab 701 of the battery 70A. Insulating glue (not shown in the figures) is disposed between the breaker 721 and the first tab 701 of the battery 70A. The resistance value of the breaker 721 is from about 0.1 mΩ to about 20 mΩ. In some embodiments of the present application, the resistance value of the breaker 721 is from about 0.5 mΩ to about 10 mΩ.

A first terminal 723*a* of the first unidirectional conduction element 723 is connected to the first tab 701 of the battery 70A, and a second terminal 723*b* of the first unidirectional conduction element 723 is connected to the first conductive lead 705. The first unidirectional conduction element 723 is disposed on the surface of the first tab 701 of the battery 70A. Insulating glue (not shown in the figures) is disposed between the first unidirectional conduction element 723 and the first tab 701 of the battery 70A.

According to some embodiments of the present application, the breaker 721 and the first unidirectional conduction element 723 may be connected to the first tab 701 of the battery 70A in other manners, such as, but not limited to, welding or attaching and fixing by using an adhering agent or a doubled-sided adhesive tape.

According to some embodiments of the present application, the first unidirectional conduction element 723 is a diode. The first terminal 723*a* of the first unidirectional conduction element 723 is a positive terminal of the diode. The resistance value of the first unidirectional conduction element 723 is from about 5 mΩ to about 500 mΩ. In some embodiments of the present application, the resistance value of the first unidirectional conduction element 723 is from about 5 mΩ to about 300 mΩ. In some embodiments of the present application, the resistance value of the first unidirectional conduction element 723 is from about 10 mΩ to about 100 mΩ. In other embodiments of the present application, the first unidirectional conduction element 723 may also be any electronic assembly with a unidirectional conduction function, such as, but not limited to, a thyristor or a field-effect transistor.

The first adapter plate 71 is used for electrically connecting the first tabs 701 of the plurality of parallel batteries 70A, 70B, 70C, 70D and 70E. The material of the first adapter plate 71 is any proper conductive material. The second adapter plate 73 is used for electrically connecting the second tabs 703 of the plurality of parallel batteries 70A, 70B, 70C, 70D and 70E. The material of the second adapter plate 73 is any proper conductive material. The second conductive lead 709 is electrically connected with the second adapter plate 73.

In another embodiment of the present application, the first terminal 721*a* of the breaker 721 is connected to the first adapter plate 71, and the second terminal 721*b* of the breaker 721 is connected to the first conductive lead 705. The first terminal 723*a* of the first unidirectional conduction element 723 is connected to the first adapter plate 71, and the second terminal 723*b* of the first unidirectional conduction element 723 is connected to the first conductive lead 705.

FIG. 7 only shows a structural schematic view formed by stacking the plurality of batteries 70A, 70B, 70C, 70D and 70E in a parallel connection manner. Of course, the embodiments of the present application are not limited thereto, for example, a battery pack structure formed by a plurality of batteries connected in series as shown in FIG. 5 is further included.

In addition, the applicant performs the following test on the batteries of the various embodiments provided by the present application. The following ten different embodiments according to the present application and one comparative embodiment only including a breaker connected with a battery in series according to the prior art are provided, and are tested for an overcharge passing rate and a discharge proportion under different charging currents and discharging currents.

Example 1

The battery 10 as shown in FIG. 1 of the present application was provided, and 16 A/20V overcharge and 64 A discharge tests were performed on the battery 10.

Example 2

The same as Example 1, a difference lies in that: the length direction of a first conductive lead of the battery is perpendicular to the first tab. The 16 A/20V overcharge and 64 A discharge tests were performed on the battery.

Example 3

The battery 30 as shown in FIG. 3 of the present application was provided, and the 16 A/20V overcharge and 64 A discharge tests were performed on the battery 30.

Example 4

The battery 10 as shown in FIG. 1 of the present application was provided, and then one single battery (namely, the battery not including the protection assembly) was connected with the battery 10 in parallel according to the manner in FIG. 6 to form a battery pack, and 32 A/20V overcharge and 128 A discharge tests were performed on the battery pack.

Example 5

The battery 10 as shown in FIG. 1 of the present application was provided, and then one single battery (namely, the battery not including the protection assembly) was connected with the battery 10 in series according to a manner in FIG. 5 to form a battery pack, and the 16 A/40V overcharge and 64 A discharge tests were performed on batteries of the battery pack.

Example 6

The battery in Example 2 was provided, and then one single battery (namely, a battery not including the protection assembly) is connected with the battery in parallel according to the manner in FIG. 6 to form a battery pack, and the 32 A/20V overcharge and 128 A discharge tests were performed on the battery pack.

Example 7

The battery in Example 2 was provided, then one single battery (namely, a battery not including the protection assembly) was connected with the battery in series according to the manner in FIG. 5 to form a battery pack, and the 16 A/40V overcharge and 64 A discharge tests were performed on the battery pack.

Example 8

The battery 20 as shown in FIG. 2 of the present application was provided, and the 16 A/20V overcharge and 64 A discharge tests were performed on the battery 20.

Example 9

The battery 10 as shown in FIG. 1 of the present application was provided, and then two single batteries (namely, the battery not including the protection assembly) were connected with the battery 10 in series according to the manner in FIG. 5 to form a battery pack, and 16 A/60V overcharge and 64 A discharge tests were performed on the battery pack.

Example 10

The battery 10 as shown in FIG. 1 of the present application was provided, and then two single batteries (namely, the battery not including the protection assembly) were connected with the battery 10 in parallel according to the manner in FIG. 6 to form a battery pack, and 48 A/20V overcharge and 192 A discharge tests were performed on the battery pack.

Comparative Example 1

The breaker was connected with a positive tab of one single battery (namely, the battery not including the protection assembly) in series, and the 16 A/20V overcharge and 64 A discharge tests were performed on the battery.

Overcharge passing rate and discharge proportion tests are performed on the batteries of the above Examples 1-10 and Comparative Example 1, testing conditions of the overcharge passing rate are as follows: a constant charging current 16 A is adopted for charging the battery to 20 V, a constant charging voltage 20 V is adopted for charging the battery for 3 h or longer, if the battery is free of a fire outbreak or explosion, the battery passes the overcharge test, and the overcharge passing rate is equal to an overcharge passing number/a testing number. Discharge proportions of the batteries are tested by adopting a testing method commonly used in the industry, and the discharge proportion of each battery is equal to discharge capacity of a battery with a protection assembly under a current of 64 A/capacity of the battery per se. By adopting the above testing method, ten batteries respectively selected from Examples 1-10 and Comparative Example 1 were tested, and corresponding testing results are listed in table 1.

TABLE 1

Overcharge test and discharge test results of the batteries of Examples 1-10 and Comparative Example 1

|  | Overcharge passing rate | Discharge proportion |
| --- | --- | --- |
| Example 1 | 10/10 | 100% |
| Example 2 | 10/10 | 100% |
| Example 3 | 10/10 | 100% |
| Example 4 | 10/10 | 100% |
| Example 5 | 10/10 | 100% |
| Example 6 | 10/10 | 100% |
| Example 7 | 10/10 | 100% |
| Example 8 | 10/10 | 100% |
| Example 9 | 10/10 | 100% |
| Example 10 | 10/10 | 100% |
| Comparative Example 1 | 10/10 | 0.1% |

It may be known from the above table 1 that, according to what is provided by the present application, the breaker and the unidirectional conduction element are connected in parallel, and then are connected to the positive tab of the battery or the battery pack, or are connected to the conductive lead connected with the positive tab, they may all meet the discharge performance requirement of the battery during discharge at large current, meanwhile, battery overcharge may be prevented, and therefore the performance requirement of large current discharge is also taken into consideration while effective protection is formed for the battery.

The technical content or technical characteristics of the present application are disclosed as above, however, those skilled familiar with the field may still make various substitutions and modifications without deviating from the spirit of the present application based on the teaching and disclosure of the present application. Thus, the protection scope of the present application should not be limited to the content disclosed in the embodiments, should contain various substitutions and modifications without deviating from the present application, and is covered by the claims of the present application.

What is claimed is:

1. A battery, comprising:
    a battery cell assembly comprising a first tab, a second tab, a first conductive lead, a sealing portion and a battery cell body, the first tab and the second tab penetrating out from the sealing portion; and
    a protection assembly located on and connected to the first tab externally from the sealing portion of the battery cell body, the protection assembly comprising a breaker and a first unidirectional conduction element, and the breaker and the first unidirectional conduction element being connected in parallel, wherein a first terminal of the breaker and a first terminal of the first unidirectional conduction element are respectively connected to the first tab, a second terminal of the breaker and a second terminal of the first unidirectional conduction element are respectively connected to the first conductive lead, and the first conductive lead being located entirely externally of the sealing portion of the battery cell outside a perimeter defined by the sealing portion and the battery cell body.

2. The battery according to claim 1, wherein the breaker is disposed on a surface of the first tab, and insulating glue is disposed between the breaker and the first tab; and
    the first unidirectional conduction element is disposed on the surface of the first tab, and insulating glue is disposed between the first unidirectional conduction element and the first tab.

3. The battery according to claim 1, wherein the battery cell assembly further comprises a second unidirectional conduction element, a first terminal of the second unidirectional conduction element is connected to the first tab, and a second terminal of the second unidirectional conduction element is connected to the first conductive lead.

4. The battery according to claim 1, wherein the first unidirectional conduction element is a diode and the first terminal of the first unidirectional conduction element is a positive terminal, and the first tab is a positive tab.

5. The battery according to claim 1, wherein a resistance value of the breaker is from about 0.1 mΩ to about 20 mΩ, and a resistance value of the first unidirectional conduction element is from about 5 mΩ to about 500 mΩ.

6. An electronic device, comprising a battery and a housing, the battery being disposed within the housing, wherein the battery comprises:
    a battery cell assembly, the battery cell assembly comprising a first tab, a second tab, a first conductive lead, a sealing portion and a battery cell body, the first tab and the second tab penetrating out from the sealing portion; and
    a protection assembly located on and connected to the first tab externally from the sealing portion of the battery cell body, the protection assembly comprising a breaker and a first unidirectional conduction element, and the breaker and the first unidirectional conduction element being connected in parallel, wherein a first terminal of the breaker and a first terminal of the first unidirectional conduction element are respectively connected to the first tab, a second terminal of the breaker and a second terminal of the first unidirectional conduction element are respectively connected to the first conductive lead, and the first conductive lead being located entirely externally of the sealing portion of the battery cell outside a perimeter defined by the sealing portion and the battery cell body.

7. The electronic device according to claim 6, wherein the battery cell assembly further comprises a second unidirectional conduction element, a first terminal of the second unidirectional conduction element is connected to the first tab, and a second terminal of the second unidirectional conduction element is connected to the first conductive lead.

8. A battery pack, comprising a first battery according to claim 1, and one or more other second batteries connected in series or parallel.

9. The battery pack according to claim 8, wherein the one or more second batteries are stacked, and the battery pack further comprises:
    a first adapter plate, for electrically connecting a first tab of each of the first battery and the one or more second batteries;
    a second adapter plate, for electrically connecting a second tab of each of the first battery and the one or more second batteries; and
    a second conductive lead, electrically connected with the second adapter plate.

10. The battery pack according to claim 9, further comprising a second unidirectional conduction element, a first terminal of the second unidirectional conduction element is connected to the first tab of the first battery, and a second terminal of the second unidirectional conduction element is connected to the first conductive lead.

* * * * *